United States Patent Office 2,802,785
Patented Aug. 13, 1957

2,802,785

WATER FLOODING PROCESS

Theodore J. Nowak, Fullerton, and Howard F. Keller, Jr., Pasadena, Calif., assignors to Union Oil Company of California, Los Angeles, Calif., a corporation of California No Drawing. Application August 30, 1954,
Serial No. 453,135

16 Claims. (Cl. 252—8.55)

This invention relates to the recovery of petroleum from subterranean formations, and in particular concerns an improved water flooding process.

The technique of water flooding to recover oil from depleted oil fields is well known. In general, such process consists in introducing an aqueous medium into one or more injection wells which penetrate a depleted oil-producing formation, and forcing said medium through the formation towards a production well which likewise penetrates the formation. In the so-called "five-spot drive," the aqueous medium is forced down four injection wells which are more or less symmetrically located around a producing well. As the flooding medium passes through the formation it strips or flushes the residual oil therefrom and carries it into the producing well from which it is recovered by conventional means. The flooding medium usually comprises water or oil field brine to which has been added various conditioning materials, e. g., surface active agents or detergents which promote the desorption of the residual oil from the formation, sequestering agents which prevent the deposition of calcium and/or magnesium compounds in the interstices of the formation, bactericides which prevent the formation from becoming plugged by bacterial growth, corrosion inhibitors which prevent corrosion of the metallic well equipment and the consequent deposition of corrosion products in the formation, etc. Thus, while the process is usually termed "water flooding" the flooding medium in fact constitutes a rather complex composition containing a variety of conditioning agents. It is not uncommon to include as many as 4 or 5 different agents of various types in the flooding medium. Such use of a plurality of agents, however, adds substantially to the cost of the process and in many instances it is found that such agents interfere with one another.

It is accordingly an object of the present invention to provide a water flooding process in which an improved flooding medium is employed.

Another object is to provide a water flooding process in which there is employed an aqueous flooding medium containing a minimum of conditioning agents.

A further object is to provide a water flooding process employing an aqueous flooding medium comprising an agent which is both surface active and bactericidal and which does not precipitate alkaline-earth metal salts.

Other and related objects will be apparent from the following detailed description of the invention, and various advantages not specifically referred to herein will occur to those skilled in the art.

We have now found that the above objects and attendant advantages may be realized in a flooding process in which the flooding medium comprises an aqueous solution of certain surface active agents which are amphoteric in nature, i. e., which ionize in such manner that both anionic and cationic functional groups are an integral part of the molecule. In addition to their surface active properties, these agents have strong bactericidal action and do not precipitate alkaline-earth metal salts. Also, presumably by reason of their amphoteric nature, these agents display a minimum tendency to become adsorbed on solid surfaces. Consequently, when employed in aqueous flooding media a minimum amount thereof is lost from the solution by adsorption on the matrix of the formation. The invention, then, consists in a water flooding process in which the flooding medium essentially comprises an aqueous solution of an amphoteric surface active agent of the class hereinafter defined.

The batericidal surface active agents which are employed in accordance with the invention are the acid salts of amido-acids having the general formula:

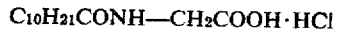

R—CONH—(CH₂CH₂NH)ₓ—R'—COOH wherein R represents an alkyl group containing from about 10 to about 22 carbon atoms, $x$ represents a numerical value from 0 to 4 inclusive, and R' represents a divalent aliphatic radical containing from 1 to 3 carbon atoms. The alkyl group R may be decyl, dodecyl, pentadecyl, cetyl, oleyl, heptadecyl, octadecyl, eicosyl, docosyl, etc., and R' may be methylene, methylmethylene, propylene, isopropylene, butylene, isobutylene, etc.

As will be apparent, the simplest compound within this class is an acid salt, e. g., the hydrochloride, of N-decyl-amido-acetic acid, C₁₀H₂₁CONH—CH₂COOH·HCl Compounds of this type, i. e., of the type wherein $x$ in the above general formula is 0, are readily prepared by reacting an 11–23 carbon atom aliphatic acid, e. g., undecylic acid, lauric acid, myristic acid, oleic acid, stearic acid, arachidic acid, etc., with an amino aliphatic acid such as glycine, alanine, beta-amino propionic acid, alpha-aminobutyric acid, etc., and thereafter adding a mineral or strong organic acid to form the acid salt. Alternatively, such salts may be prepared by reaction between an 11–23 carbon atom amide, e. g., laurylamide, with a haloaliphatic acid such as chloroacetic acid or bromopropionic acid. The more complex members of the class, i. e., those in which the value of $x$ is from 1 to 4, are preferably formed by reacting an 11–23 carbon atom aliphatic acid with ethylenediamine or a polyethylene polyamine such as diethylene triamine, triethylenetetramine or tetraethylenepentamine to form the corresponding alkyl-amido-ethyleneamine or polyethylene polyamine, and thereafter reacting the latter with a haloaliphatic acid. Thus, palmitic acid may be reacted with diethylenetriamine and the product thereafter reacted with alpha-bromopropionic acid to form pentadecyl-amido-diethylenediamino-propionic acid hydrobromide,

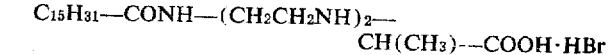

C₁₅H₃₁—CONH—(CH₂CH₂NH)₂—

CH(CH₃)—COOH·HBr

As further examples of the bactericidal surface active agents which are employed in accordance with the invention and defined by the above general formula, there may be mentioned the hydrohalide and other acid salts of decyl-amido-acetic acid, dodecyl-amido-propionic acid, oleyl-amido-isobutyric acid, decosyl-amido-isobutyric acid, heptadecyl-amido-methylacetic acid, decyl-amido-ethyleneamino-acetic acid, dodecyl-amido-diethylenediamino-propionic acid, octadecyl-amido-tetraethyltetramino-isobutyric acid, eicosyl-amido-triethylene-triamino-acetic acid, tetradecyl-amido-ethyleneamino-methylacetic acid, etc.

All of the compounds of the present class display the desired amphoteric properties in that they ionize at the acid group to form anions and at the amino group or groups to form cations. They are preferably employed in the form of their hydrochloride or other hydrohalide or sulfate salts, but other acid salts such as the acetates are operable. By reason of their stronger surface active and bactericidal properties, the acid salts of the type containing one or more ethyleneamino groups, i. e., salts in which the value of x in the general formula is from 1 to 4, are preferred. The following examples will illustrate the preparation and properties of several of the compounds of the present class, but are not to be construed as limiting the invention.

*Example I*

Approximately 282 parts by weight (1 mole) of oleic acid and 103 parts (1 mole) of diethylenetriamine were heated at 300° F. for 3 hours to obtain oleyl-amido-diethylenediamine, and 36.7 parts of the latter product was treated with 10.8 parts of alpha-chloropropionic acid at room temperature to obtain oleyl-amido-diethylenediamino-propionic acid hydrochloride,

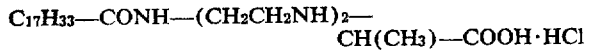

In crude form this product is a very viscous yellow oil, but in purified form is a crystalline solid. At a concentration of 1000 p. p. m. an aqueous solution has a surface tension of about 42 dynes; at 100 p. p. m. the surface tension is about 45.5 dynes. Upon testing in varying concentrations on the bacteria present in a typical Southern California oil field brine, the following data were obtained:

Concentration in p. p. m.: Bacteria/cc.
```
    0 (Blank) _____  >500,000
  100 _____     4,500
   25 _____    25,000
   10 _____    50,000
```

*Example II*

Oleyl - amido - diethylenediamino - acetic acid hydrochloride,

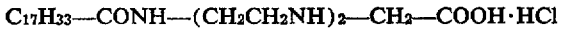

was prepared by reacting equimolecular quantities of the oleyl-amido-diethylenediamine and chloroacetic acid. In crude form, this product was a viscous yellow liquid. At a concentration of 1000 p. p. m. an aqueous solution has a surface tension of about 40 dynes; at 100 p. p. m. the surface tension is 44 dynes. The bactericidal test data were as follows:

Concentration in p. p. m.: Bacteria/cc.
```
    0 (Blank) _____  >500,000
  100 _____     8,400
   50 _____    28,000
```

*Example III*

An equimolecular mixture of oleic acid and tetraethylene-pentamine was heated at 300° F. for 3 hours, after which the reaction product was cooled to room temperature and treated with an equimolecular amount of chloroacetic acid. The resulting product, oleyl-amido-tetraethylenetetramino acetic acid hydrochloride, was a crystalline solid highly soluble in water. At a concentration of 1000 p. p. m. an aqueous solution thereof had a surface tension of about 42 dynes, at 100 p. p. m. the surface tension was about 43.4 dynes, and at 10 p. p. m. it was about 49.4 dynes. Bactericidal test data were as follows:

Concentration in p. p. m.: Bacteria/cc.
```
    0 (Blank) _____  >500,000
  100 _____         0
   50 _____         0
   25 _____         0
    5 _____     5,000
```

The product obtained when alpha-chloropropionic acid was substituted for the chloroacetic acid

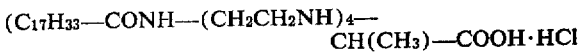

had similar properties.

*Example IV*

Examples I and II were repeated, using tall oil acids instead of oleic acid. The two products had excellent surface active and bactericidal properties.

In carrying out the present process, the flooding operation is effected in the conventional manner except that the flooding medium consists essentially of an aqueous solution of one or a mixture of the above-decribed amphoteric surface active agents. The concentration of the latter in the flooding medium is usually not greater than 500 parts per million and in many cases may be as low as 2 parts per million, depending upon the identity of the surface active agent, the nature of the formation being subjected to flooding, and the degree of bacteria control required. In a typical five-spot flooding operation, oil field brine containing 50 parts per million of oleyl-amido-tetraethylenetetramino-acetic acid hydrochloride is introduced at a rate of about 450 bbls. per day into each of the four input wells under a pressure sufficient to force said solution into the formation and drive it therethrough towards the centrally local output well. The operation can be continued over long periods of time without requiring any substantial increase in the pressure required to force the flooding medium through the formation, thus demonstrating that no substantial plugging of the formation occurs either by precipitation of alkaline-earth metal salts or by bacterial growth.

While the flooding media employed in accordance with the present invention essentially comprise only water or oil field brine and one or more of the herein described amphoteric surface active agents, they may also comprise corrosion inhibitors, tracers, supplemental bactericides, and the like. Similarly, they may be employed in conjunction with any of the operating techniques commonly applied to water flooding processes and in conjunction with other secondary recovery methods.

Other modes of applying the principle of our invention may be employed instead of those explained, change being made as regards the methods or materials employed, provided the step or steps stated by any of the following claims, or the equivalent of such stated step or steps, be employed.

We, therefore, particularly point out and distinctly claim as our invention:

1. In a process wherein an aqueous flooding medium is injected into a subterranean oil-bearing formation and is forced therethrough towards an output well, the improvement which consists in employing a flooding medium consisting essentially of an aqueous solution of an acid salt of a compound having the general formula:

R—CONH—(CH₂CH₂NH)ₓ—R'—COOH wherein R represents an alkyl group containing from about 10 to about 22 carbon atoms, x represents a numerical value from 0 to 4, and R' represents a divalent aliphatic radical containing from 1 to 3 carbon atoms.

2. The process of claim 1 wherein the concentration of the said acid salt in said aqueous solution is between about 2 and about 500 parts per million.

3. The process of claim 1 wherein the said acid salt is a hydrohalide.

4. The process of claim 1 wherein x has a value from 1 to 4.

5. The process of claim 1 wherein the said acid salt is oleyl-amido-diethylenediamino-acetic acid hydrochloride having the structurel formula

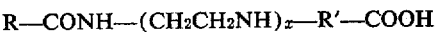

6. The process of claim 1 wherein the said acid salt is oleyl-amido-diethylenediamino-propionic acid hydrochloride having the structural formula C$_{17}$H$_{33}$—CONH—(CH$_2$CH$_2$NH)$_2$—
                             CH(CH$_3$)—COOH·HCl 7. The process of claim 1 wherein the said acid salt is oleyl-amido-tetraethylenetetramino-acetic acid hydrochloride having the structural formula C$_{17}$H$_{33}$—COOH—(CH$_2$CH$_2$NH)$_4$—CH$_2$—COOH·HCl 8. The process of claim 1 wherein the said acid salt is olyel-amido-tetraethylenetetraminopropionic acid having the structural formula C$_{17}$H$_{33}$—CONH—(CH$_2$CH$_2$NH)$_4$—
                             CH(CH$_3$)COOH·HCl 9. The process for recovering oil from a subterranean oil-bearing formation which comprises introducing into an input well penetrating said formation a flooding medium consisting essentially of an aqueous solution of an acid salt of a compound having the general formula:

R—CONH—(CH$_2$CH$_2$NH)$_x$—R'—COOH wherein R represents an alkyl group containing from about 10 to about 22 carbon atoms, $x$ represents a numerical value from 0 to 4, and R' represents a divalent aliphatic radical containing from 1 to 3 carbon atoms; forcing said medium through said formation towards at least one output well penetrating said formation at a distance from said input well; and producing oleiferous well fluids from said output well.

10. The process of claim 9 wherein the concentration of said acid salt in said aqueous solution is between about 2 and about 500 parts per million.

11. The process of claim 9 wherein the said acid salt is a hydrohalide.

12. The process of claim 9 wherein $x$ has a value from 1 to 4.

13. The process of claim 9 wherein the said acid salt is oleyl-amido-diethylenediamino-acetic acid hydrochloride having the structural formula

C$_{17}$H$_{33}$—CONH—(CH$_2$CH$_2$NH)$_2$—CH$_2$—COOH·HC

14. The process of claim 9 wherein the said acid salt is oleyl-amido-diethylenediamino-propionic acid hydrochloride having the structural formula C$_{17}$H$_{33}$—CONH—(CH$_2$CH$_2$NH)$_2$—
                             CH(CH$_3$)—COOH·HCl 15. The process of claim 9 wherein the said acid salt is oleyl-amido-tetraethylenetetramino-acetic acid hydrochloride having the structural formula C$_{17}$H$_{33}$—COOH—(CH$_2$CH$_2$NH)$_4$—CH$_2$—COOH·HCl 16. The process of claim 9 wherein the said acid salt is oleyl-amido-tetraethylenetetramino-propionic acid having the structural formula C$_{17}$H$_{33}$—CONH—(CH$_2$CH$_2$NH)$_4$—
                             CH(CH$_3$)COOH·HCl

References Cited in the file of this patent
UNITED STATES PATENTS

| 2,226,119 | DeGroote et al. | Dec. 24, 1940 |

FOREIGN PATENTS

| 856,042 | Germany | Nov. 17, 1952 |
| 692,022 | Great Britain | May 17, 1953 |

OTHER REFERENCES

Latter: Corrosion Control, article in World Oil, January 1951, pp. 141, 142 and 144.

UNITED STATES PATENT OFFICE

CERTIFICATE OF CORRECTION

Patent No. 2,802,785                                                     August 13, 1957

Theodore J. Nowak et al.

It is hereby certified that error appears in the printed specification of the above numbered patent requiring correction and that the said Letters Patent should read as corrected below.

Column 2, line 60, for "decosyl" read -- docosyl --; column 4, line 73, for "structurel" read -- structural --; line 74, and column 6, line 6, for "—COOH·HC", each occurrence, read -- —COOH·HCl --.

Signed and sealed this 29th day of October 1957.

(SEAL)
Attest:

KARL H. AXLINE                                                    ROBERT C. WATSON
Attesting Officer                                            Commissioner of Patents